No. 840,012.                                    PATENTED JAN. 1, 1907.
L. L. ROARK.
THILL OR TONGUE SUPPORT.
APPLICATION FILED MAY 26, 1906.
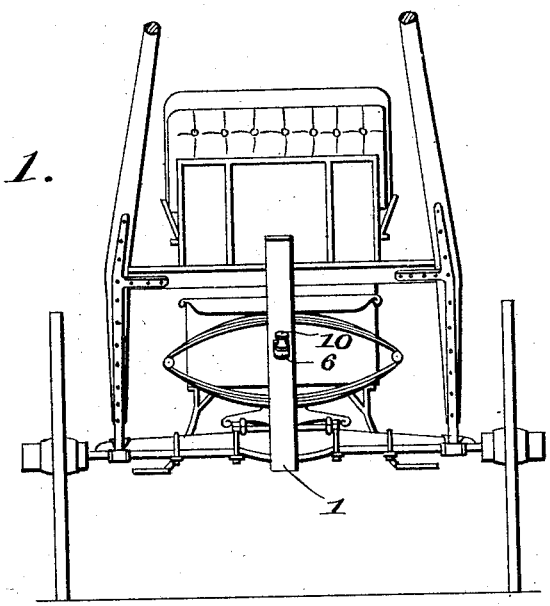
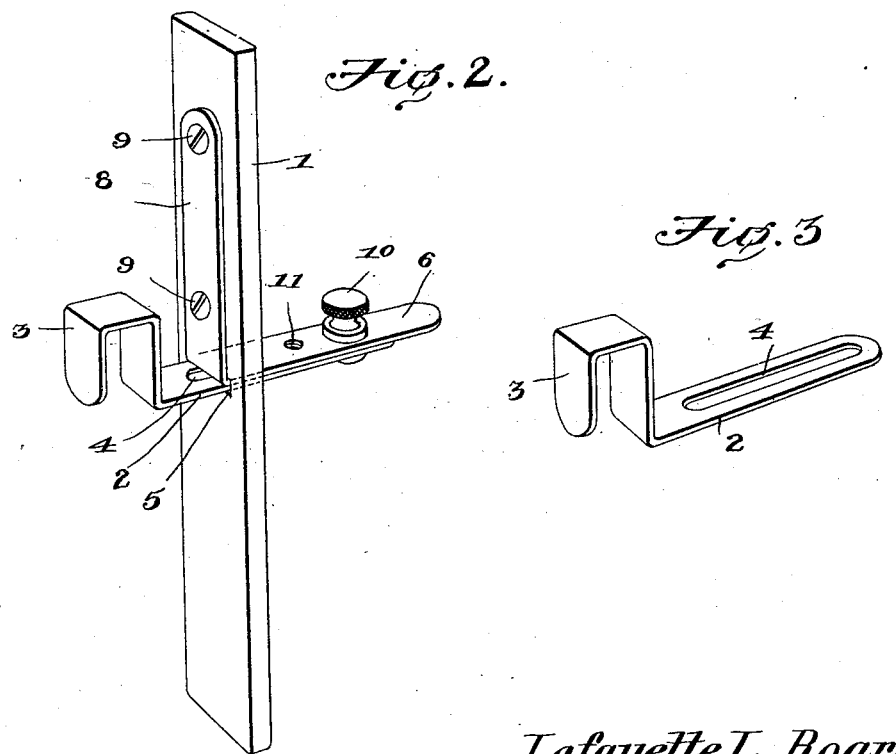
Lafayette L. Roark,
INVENTOR.
WITNESSES:
By C. A. Snow & Co.
ATTORNEYS

UNITED STATES PATENT OFFICE.

LAFAYETTE L. ROARK, OF DENTON, TEXAS.

THILL OR TONGUE SUPPORT.

No. 840,012.         Specification of Letters Patent.         Patented Jan. 1, 1907.

Application filed May 26, 1906. Serial No. 318,958.

*To all whom it may concern:*

Be it known that I, LAFAYETTE L. ROARK, a citizen of the United States, residing at Denton, in the county of Denton and State of Texas, have invented a new and useful Thill or Tongue Support, of which the following is a specification.

The present invention relates to a device for supporting shafts of a horse-drawn vehicle; and it has for its objects to provide a device of this character which is readily applicable for supporting the thills or tongues of wagons, carriages, and the like in an upright position, the same being of simple and substantial construction, inexpensive to manufacture, readily adjustable, and reliable in operation.

With these and other objects in view, as will be readily understood from the following description, the invention comprises various details of construction and arrangement of parts, which will be more fully set forth hereinafter in connection with the accompanying drawings, and the features of novelty will be defined with particularity in the appended claims.

In the accompanying drawings, which illustrate one of the embodiments of the invention, Figure 1 is a front view of a vehicle, showing my improved thill-support applied thereto for holding the thills in upright position. Fig. 2 is a perspective view of the support. Fig. 3 is a perspective view of the hook member of the support.

Corresponding parts in the several figures are indicated throughout by similar characters of reference.

Referring to the drawings, 1 represents the bar or body of the thill-support, the same comprising, preferably, a straight piece of wood of suitable cross-section to provide the desired strength and rigidity, although it is to be understood that any other material and any desired shape may be employed. Intermediate the ends of the support or body 1, approximately at the center thereof, is a transverse slot through which extends the shank 2 of the hook 3. The hook is preferably made of a single strip of metal bent to the desired shape and provided with a longitudinal slot 4. Passing through the transverse slot 5 in the body 1 is an arm 6, on which the hook is secured and guided. The arm is also made of a single strip of metal, which is bent intermediate its length at right angles. This angularly-bent member is inserted through the transverse slot 5 from the front of the body 1, and the portion 8 thereof is secured to the body on its front face by screws or other devices 9.

The hook member of the support is adjustable on the arm 6, so as to hold the shafts in the desired position. For securing the hook in adjusted position a screw and set-nut 10 is provided, the screw of which passes through an opening in the arm 6 and the slot 4 of the shank of the hook. By loosening the thumb-nut the hook can be moved in or out to any desired position and held in said position by screwing the thumb-nut home.

In order to increase or vary the range of movement of the hook, two or more openings 11 may be provided in the transversely-extending arm 6 for receiving the shank of the setting-screw.

To apply the support to a vehicle so as to hold up the thills or tongue, the thills are raised to an upright position, and the support is placed in front of the vehicle with one end adjacent the axle and bearing against the same, while the upper end of the support bears against the cross-bar of the thills. While in this position the hook is manipulated so as to embrace the front springs or spring-bar of the vehicle, as may be best found desirable, and when so hooked the support is held in position, so that the thills are maintained upright. In applying the support it may be necessary to adjust the hook so as to engage it over the springs or spring-bar. This can be readily done by means of the construction described.

While I have described the support in connection with a single horse-drawn vehicle, it is to be understood that the same can be used with equal facility on a vehicle provided with a tongue draft device.

I have described the principle of operation of the invention, together with the apparatus which I now consider to be the best embodiment thereof; but I desire to have it understood that the apparatus shown is merely illustrative and that various minor changes in the arrangement of parts, proportions, and details may be resorted to as lie within the scope of the claims hereto appended.

What is claimed is—

1. In a device of the class described, the combination of a supporting member provided with a central transverse slot, a guide-arm arranged adjacent to said slot and extending at right angles to the member and from one side thereof, and an adjustable hook disposed on the side of the member opposite from the arm and having its shank guided through the slot and bearing on and secured to the said arm.

2. In a device of the class described, the combination of a supporting-bar having a transverse slot, a hook provided with a shank portion extending through said slot, an arm extending rearwardly from the side of the bar opposite from the hook, and means between the arm and shank for adjustably securing the hook on the bar.

3. In a device of the class described, the combination of a supporting-bar having a transverse slot, a hook provided with a slotted shank that extends through the slot, a member having a portion extending along the bar at one side of the latter and a portion extending through the slot and at right angles to the bar to form a supporting-arm for the hook, and a clamping device carried by the arm that engages the slot of the shank for permitting the hook to be adjusted on the support.

In testimony that I claim the foregoing as my own I have hereto affixed my signature in the presence of two witnesses.

LAFAYETTE L. ROARK.

Witnesses:
NOAH ROARK,
M. B. ROARK.